United States Patent
Kirsch

(10) Patent No.: US 6,987,971 B2
(45) Date of Patent: Jan. 17, 2006

(54) PROCESS AND DEVICE FOR ESTIMATING THE SPEED OF MOVEMENT OF A MOBILE TERMINAL, IN PARTICULAR A CELLULAR MOBILE TELEPHONE

(75) Inventor: Miguel Kirsch, Coppet (CH)

(73) Assignee: STMicroelectronics N.V., Amsterdam (NL)

(*) Notice: Subject to any disclaimer, the term of this patent is extended or adjusted under 35 U.S.C. 154(b) by 479 days.

(21) Appl. No.: 10/232,117

(22) Filed: Aug. 30, 2002

(65) Prior Publication Data

US 2003/0050017 A1    Mar. 13, 2003

(30) Foreign Application Priority Data

Sep. 3, 2001  (EP) .................................. 01121077

(51) Int. Cl.
*H04Q 7/20*  (2006.01)

(52) U.S. Cl. .................................... 455/441; 455/67.11
(58) Field of Classification Search ................ 455/436, 455/437, 441, 67.11, 422.1, 432.1; 73/488
See application file for complete search history.

(56) References Cited

U.S. PATENT DOCUMENTS

| | | | |
|---|---|---|---|
| 6,084,546 A * | 7/2000 | Wax et al. ................... 342/378 |
| 6,377,813 B1 * | 4/2002 | Kansakoski et al. ......... 455/522 |
| 6,542,745 B1 * | 4/2003 | Mottier et al. .............. 455/441 |
| 2002/0089947 A1 * | 7/2002 | Holtzman et al. ........... 370/328 |

FOREIGN PATENT DOCUMENTS

| EP | 1014107 | 6/2000 |
|---|---|---|
| EP | 1026518 | 8/2000 |

OTHER PUBLICATIONS

Austin et al., Velocity Adaptive Handoff Algorithms for Microcellular Systems, IEEE Transactions on Vehicular Technology IEEE Inc., New York, US, vol. 43, No. 3, Part 1, Aug. 1, 1994, pp. 549-561.

* cited by examiner

*Primary Examiner*—Nguyen T. Vo
(74) *Attorney, Agent, or Firm*—Lisa K. Jorgenson; Allen, Dyer, Doppelt, Milbrath & Gilchrist, P.A.

(57) ABSTRACT

Estimating the speed of movement of a mobile terminal of a wireless communication system communicating with a base station includes calculating a normalized auto-covariance of the instantaneous power of the signal received by the mobile terminal or by the base station.

30 Claims, 5 Drawing Sheets

PROCESS AND DEVICE FOR ESTIMATING THE SPEED OF MOVEMENT OF A MOBILE TERMINAL, IN PARTICULAR A CELLULAR MOBILE TELEPHONE

FIELD OF THE INVENTION

The present invention relates to the transmission of digital information, such as the exchange of digital information associated with a cellular mobile telephone operating in the GSM and WCDMA network systems. The present invention relates more particularly to estimating the speed of a moving mobile terminal, such as a cellular mobile telephone communicating with a base station.

BACKGROUND OF THE INVENTION

Each base station of a communication system radiates within a cell, and consequently, talks to all the telephones situated in this cell. When the user of a telephone moves and reaches the border of a cell, the base station can decide, depending on specific parameters measured by the telephone, to hand the telephone over to another base station.

Estimation of the speed of movement of the mobile telephone is a parameter which may be taken into account by the base station in deciding whether to transfer to another base station. Estimation of the speed can also be used to improve the monitoring of the reception power of the signal.

European Patent Application No. 1,014,107 discloses a method of estimating the speed of movement of a cellular mobile telephone. This method is based on an autocorrelation of the filtered power of the signal received. However, such a method is sensitive to the characteristics of the transmission channel, and in particular, to the number of coefficients of its impulse response. Furthermore, this method allows only binary information to be obtained, namely whether the mobile terminal is moving at low-speed or high-speed.

SUMMARY OF THE INVENTION

An object of the invention is to estimate the speed of movement of the mobile terminal, which exhibits a smaller margin of error and which is independent of the number of coefficients of the impulse response of the channel.

Another object of the invention is to also estimate the speed, which makes it possible to obtain a value of the speed instead of merely a binary indication of the type of speed, i.e., a slow or fast speed.

The invention therefore proposes a process for estimating the speed of movement of a mobile terminal of a wireless communication system talking to a base station, in which the estimation of the speed comprises a calculation of a normalized auto-covariance of the instantaneous power of the signal received by the mobile terminal or by the base station.

Stated otherwise, the estimation of speed is based on a normalized auto-covariance and no longer on an autocorrelation as in the prior art. It is recalled here that the auto-covariance of a signal is in fact the signal's autocorrelation from which the average value of the signal has been deducted. Also, by calculating a normalized auto-covariance it is possible to obtain a result independent of the number of coefficients of the impulse response of the channel, and the speed information stemming therefrom is then obtained with a smaller margin or error.

The calculation of the normalized auto-covariance is performed with a time shift parameter τ advantageously chosen to obtain a normalized auto-covariance result between a predetermined lower threshold and a predetermined upper threshold. This makes it possible to provide the most exact measurement possible of the speed of movement of the mobile terminal. Indeed, one is then situated in a near-linear and monotonic region of the normalized auto-covariance curve.

This lower threshold is chosen equal to around 0.2 for example, while the upper threshold is chosen equal to around 0.8 for example. The estimation of speed then advantageously comprises an adaptation of the value of the parameter τ to obtain a normalized auto-covariance result situated between the lower threshold and the upper threshold.

According to one mode of implementation of the invention, the calculation of the normalized auto-covariance comprises a calculation of signal power, then a low-pass filtering and a subtraction of the averaged power.

According to one mode of implementation, when the signal conveys information formed of fragments (otherwise known as chips) incorporated within successive intervals each containing a predetermined number of fragments, the calculation of the normalized auto-covariance is performed on M intervals mutually time-shifted by the time shift parameter τ. The calculation of the signal power and the low-pass filtering then comprises for each of the M intervals, a calculation of power over a predetermined number P of fragments of the relevant interval to obtain P power samples, then an average of these P samples to obtain a single final power sample for the relevant interval. The determination of the averaged power is then performed by averaging the M final power samples.

The estimation of speed may then comprise an adaptation of the value of the parameter τ and an adaptation of the value of M, with M increasing as τ decreases, and with M decreasing as τ increases.

The subject of the invention is also directed to a device for estimating the speed of movement of a mobile terminal of a wireless communication system talking to a base station. According to a general characteristic of the invention, the device comprises an input for receiving the signal transmitted between the station and the terminal, and means of estimation of speed comprising means of processing for calculating a normalized auto-covariance of the instantaneous power of the signal received at the input.

According to one embodiment of the invention, the means of processing calculate the normalized auto-covariance with a time shift parameter τ chosen for obtaining a normalized auto-covariance result lying between a predetermined lower threshold and a predetermined upper threshold, for example lying between around 0.2 and 0.8. The means of estimation of speed advantageously comprise means of adaptation for performing an adaptation of the value of the parameter τ to obtain a normalized auto-covariance result situated between the lower threshold and the upper threshold.

According to one embodiment of the invention, the means of processing comprise first means of calculation for calculating the instantaneous power of the signal, means of low-pass filtering, second means of calculation for calculating an average power, and means of subtraction able to deduct this average power from the autocorrelation of the instantaneous power.

When the signal conveys information formed of fragments incorporated within successive intervals each containing a predetermined number of fragments, the means of processing advantageously calculate the normalized autocovariance performed on M intervals mutually time-shifted by the time shift parameter τ of the normalized auto-covariance.

The first means of calculation and the means of low-pass filtering are then able for each of the M intervals, to perform a calculation of power over a predetermined number P of fragments of the relevant interval to obtain P power samples, then an average of these P samples to obtain a single final power sample for the relevant interval. The second means of calculation then compute an average of the M final power samples. The means of adaptation also advantageously perform an adaptation of the value of M, with M increasing as τ decreases, and with M decreasing as τ increases.

The subject of the invention is also directed to a mobile terminal, in particular a cellular mobile telephone, comprising a device for estimating speed as defined above. The subject of the invention is also directed to a base station of a wireless communication system communicating with a mobile terminal, and comprising a device for estimating speed as defined above.

BRIEF DESCRIPTION OF THE DRAWINGS

Other advantages and characteristics of the invention will appear on examining the detailed description of modes of implementation and embodiments, which are in no way limiting, and the appended drawings, in which.

DETAILED DESCRIPTION OF THE PREFERRED EMBODIMENTS

Figure 1:
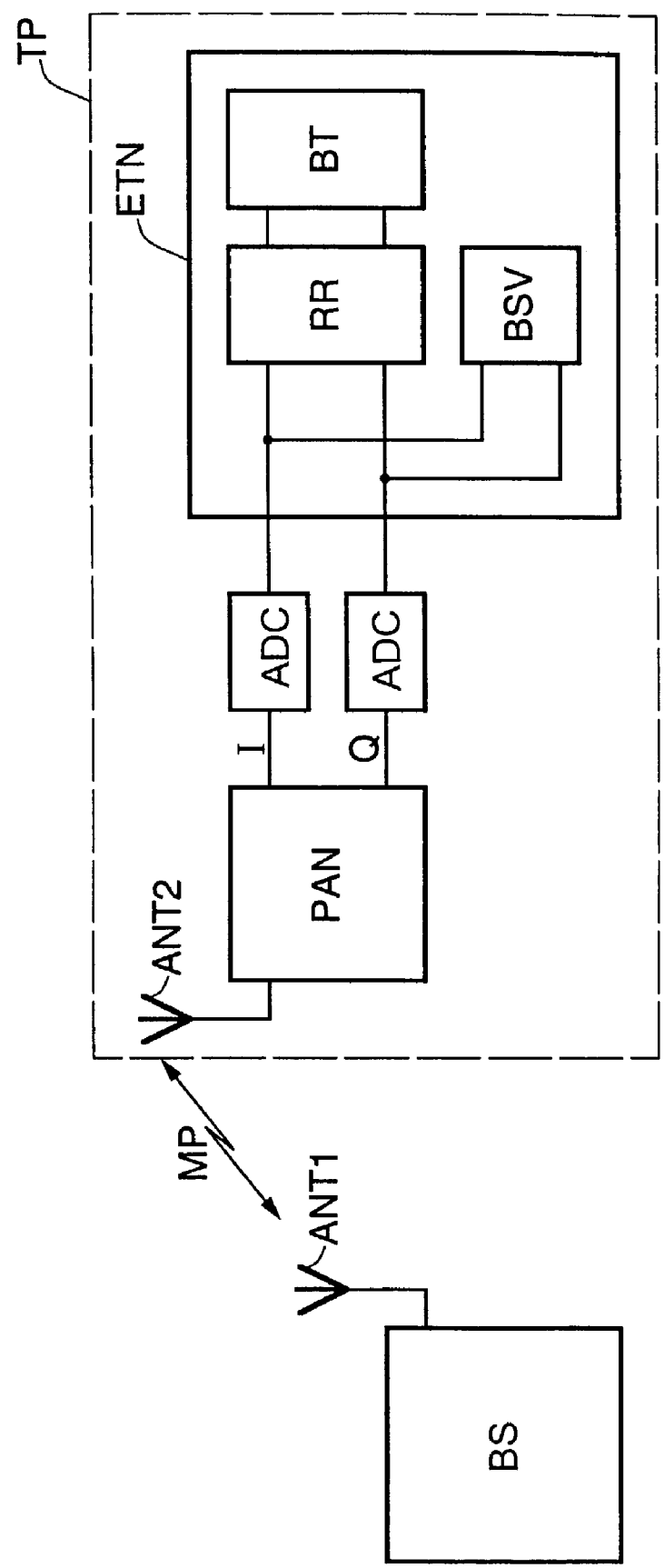
FIG. 1 diagrammatically illustrates a base station and a cellular mobile telephone which are capable of implementing the process according to the present invention.
Figure 2:
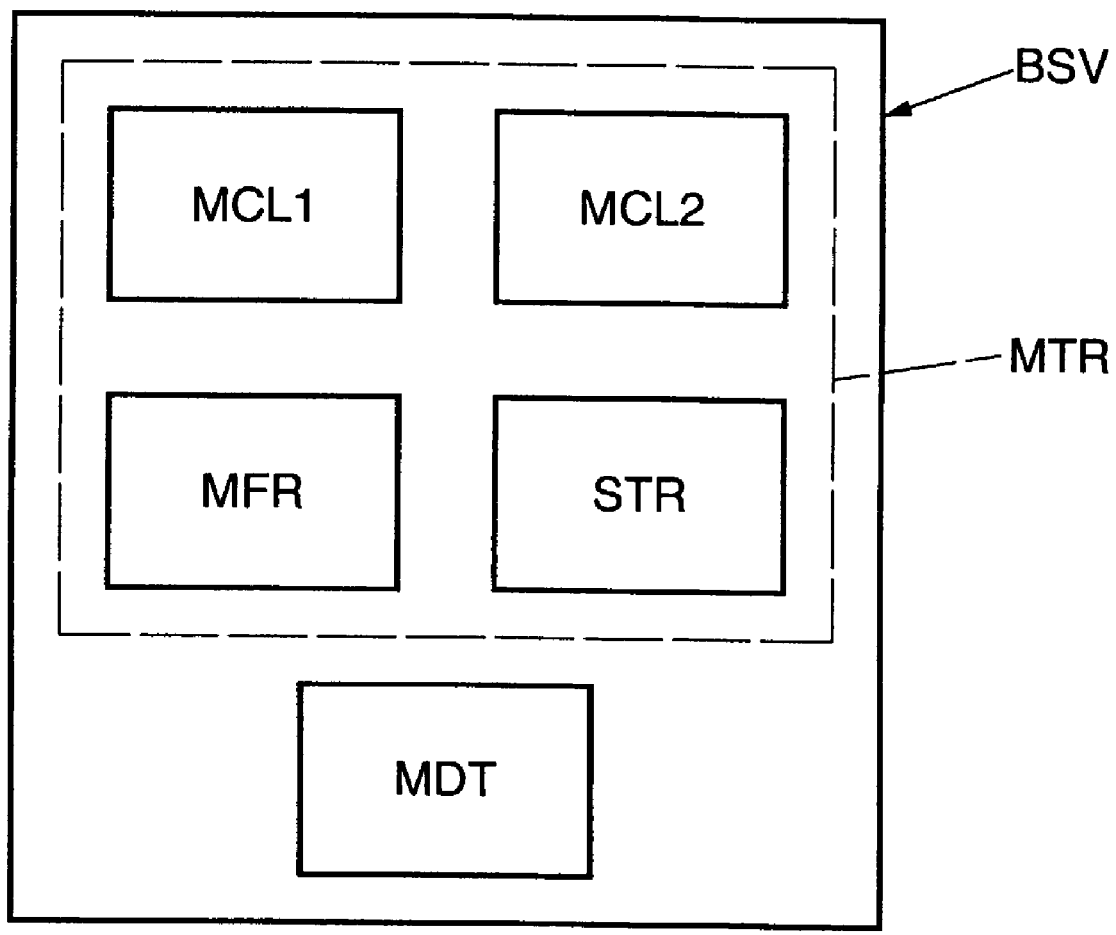
FIG. 2 illustrates in greater detail but still diagrammatically the internal structure of the means of estimating speed of a telephone according to the present invention.

In FIG. 1, the reference BS designates a transmitter, for example, a base station. The base station receives the useful data to be transmitted, for example, speech. The station performs in particular the so-called "channel coding" conventional processing operations by introducing redundancies into the data screen.

The station BS also conventionally comprises a modulator performing, for example, a quadrature modulation of the QPSK or 8PSK type for transforming the binary signal emanating from the channel coding processing into an analog signal. The analog signal is then filtered in a transmission filter before being transmitted towards the receiver TP via an antenna ANT1. The means of propagation MP between the base station BS and a receiver TP, which is a cellular telephone in the illustrated example, is air.

The cellular mobile telephone TP essentially comprises at the frontend an antenna ANT2 coupled to an analog stage PAN for carrying out a frequency conversion for reducing the signal received to baseband, and a filtering for retaining only the useful part of the spectrum. The output of the analog stage PAN is formed of two quadrature signals I and Q according to nomenclature which is well known to the person skilled in the art. After sampling and analog/digital conversion in the converters ADC, the two signals I and Q are delivered to a digital processing stage ETN.

When the wireless communication system is a CDMA system (Code Division Multiple Access system), such as the various mobile telephone systems based on the CDMA system, which includes the CDMA 2000 system, the WCDMA (Wideband CDMA) system or the IS-95 Standard, the digital processing stage ETN comprises in a conventional manner a receiver RR, commonly referred to by the person skilled in the art as a RAKE receiver. This receiver RR is followed by a processing block BT which performs in a conventional manner a demodulation processing of the spectrum delivered by the Rake receiver RR, then a source decoding well known to the person skilled in the art.

It is recalled here that the CDMA schemes allow multiple users to share a common frequency and a common time channel by using coded modulation. Thus, as is well known to the person skilled in the art, before transmission via the antenna of the base station BS, the initial signal containing the information (symbols) is scrambled and spread by processing means of the base station, by using a scrambling code of the base station and the orthogonal code (OVSF code) of the telephone TP.

Furthermore, because of the possible reflections of the initially transmitted signal off obstacles situated between the base station and the mobile telephone, the transmission medium is in fact a multipath transmission medium. That is, one which comprises several different transmission routes. Consequently, the signal which is received by the mobile telephone comprises various temporally delayed versions of the initially transmitted signal. These versions are the result of the multipath transmission characteristics of the transmission medium.

The Rake receiver RR is used to perform the temporal alignment, the descrambling, the despreading and the combining of the delayed versions of the initial signals for delivering the information contained in the initial signals.

Apart from the conventional means which have just been briefly alluded to, the digital stage ETN furthermore comprises a block BSV comprising speed estimation means which will estimate the speed of movement of the mobile terminal on the basis of the digital signal I and Q received at the input of this digital stage ETN, and of a normalized auto-covariance of the instantaneous power of this received signal.

Functionally, the processing means MTR of the block BSV comprise first means of calculation of power for calculating the instantaneous power of the signal, means of low-pass filtering MFR, second means of calculation MCL2 for calculating an average power, and means of subtraction for deducting this average power from the autocorrelation of the instantaneous power. These means will be revisited in greater detail below.

Furthermore, the means of estimation of speed BSV moreover comprise means of adaptation MDT which, as will be seen in greater detail below, adapts the time shift parameter τ of the auto-covariance as a function of the result of the normalized auto-covariance.

In terms of hardware, the means of estimation of speed BSV may be embodied through a signal processor, for example. The various processing operations performed in the means of estimation of speed BSV may be carried out in software. These processing operations are then in the form of program code which can easily be written by the person skilled in the art on the basis of the functional definition of these processing operations. The program code may be stored in a read only memory associated with the processor, for example. With this being so, a full hardware embodiment or a partial hardware embodiment is also possible, for example, in the form of an application specific integrated circuit (ASIC).

Figure 3:
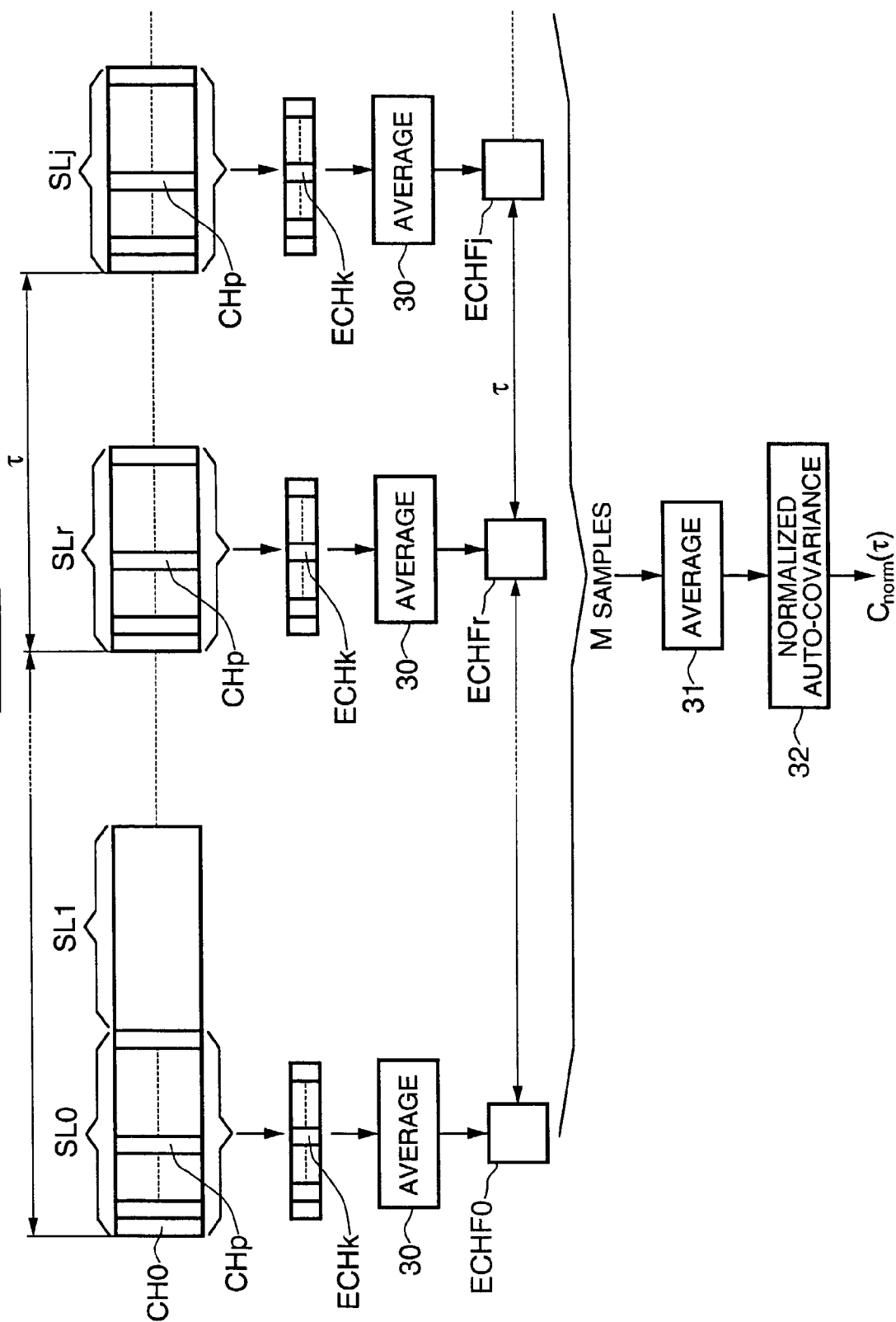
FIG. 3 diagrammatically illustrates a mode of implementation according to the present invention.

Reference will now be made more especially to FIG. 3, to describe in greater detail a mode of implementation of the invention. As indicated above, in a CDMA system, the initial signal containing the information (symbols) is scrambled and spread by using the scrambling code of the base station and the orthogonal code (OVSF code) of the telephone TP.

Consequently, the symbols are transformed into fragments (otherwise known as chips) having a predetermined length (for example, equal to 260 ns), and corresponding to a predetermined fragment rate (otherwise known as chip rate) equal to 3.84 Mcps, for example.

By way of indication, a symbol may be transformed into a number of fragments ranging from 4 to 256. The information transmitted by the base station and formed of fragments is conveyed within successive frames each subdivided into a predetermined number of intervals (otherwise known as slots) SLi. By way of indication, each frame, having a length of 10 ms, is subdivided into 15 intervals, with each interval having a length equal to 2560 fragments.

In the mode of implementation which is described here, the normalized auto-covariance is calculated over M samples, mutually time-shifted by the time shift parameter τ of the auto-covariance. Consequently, the first means of calculation of power MCL1 will calculate the instantaneous power of the signal received basing themselves on M intervals SLr, mutually time-shifted by the parameter τ.

For simplification purposes, one of these intervals, namely the interval SLr, will now be considered. If $x_r(q)$ designates the instantaneous power of the signal contained in a fragment of this interval SLr, $x_r(q)$ is defined by formula (I) below:

$$x_r(q) = I_r(q)^2 + Q_r(q)^2 \quad (I)$$

in which $I_r$ and $Q_r$ designate the two phase-quadrature information corresponding to this fragment.

It should be noted here that the signal which is taken into account is that which is received by the portable telephone, whether or not the information contained in this signal is intended for this portable telephone. In practice, there will always be a signal present at the input of the digital stage, at least the pilot signal. The first means of calculation will perform this calculation of power over a predetermined number P of fragments, for example, over 256 fragments, that is, one fragment for every ten of the interval. Thus, P power samples ECHk are obtained.

Next, the low-pass filtering means will compute an average 30 (FIG. 3) of these P power samples to obtain a final power sample ECHFr whose level s(r) is defined by formula (II) below:

$$s(r) = \frac{1}{P} \sum_{q=1}^{P} x_r((q-1)D) \quad (II)$$

In this formula, D designates a decimation coefficient which is equal to 10 since we have chosen to calculate the instantaneous power every 10 samples.

By performing a low-pass filtering, most of the undesired frequencies are eliminated while basically retaining the Doppler information. Thus, by way of indication, if one considers a maximum Doppler frequency which is always less than or equal to 500 Hz, since one is interested only in speeds less than or equal to 300 km/h, one will choose a cutoff frequency of the low-pass filter in the vicinity of 1000 kHz for a carrier frequency of 2 GHz.

Once these M samples have been obtained, the second means of calculation MCL2 calculates the average of the instantaneous power over these M samples ECHFr in accordance with formula (III) below:

$$\bar{s} = \frac{1}{M} \sum_{r=1}^{M} s(r) \quad (III)$$

Next, the processing means calculates the normalized auto-covariance of this signal of instantaneous power, in accordance with formula (IV) below:

$$C_{norm}(\tau) = \frac{C(\tau)}{C(o)} = \frac{\sum_{r=1}^{M-1}(s(r+1)-\bar{s})(s(r)-\bar{s})}{\sum_{r=1}^{M-1}(s(r)-\bar{s})^2} \quad (IV)$$

In this formula, the numerator corresponds to the auto-covariance of the signal for a shift parameter τ corresponding to the time shift between two intervals taken into account successively for the calculation of the auto-covariance. The denominator makes it possible to normalize this auto-covariance, and corresponds to an auto-covariance calculated for a parameter τ=0.

The speed of movement of the mobile terminal can then be calculated in accordance with formula (V) below:

$$V = \frac{\sqrt{1-\sqrt{C_{norm}^{(\tau)}}}}{\pi \tau} \cdot \frac{c}{F0} \cdot 3.6 \quad (V)$$

This formula (V) corresponds to a second-order Taylor approximation, expanded about τ=0, of the cosine term present in the theoretical formula for the normalized auto-covariance. Of course, higher-order approximations are possible.

Figure 4:
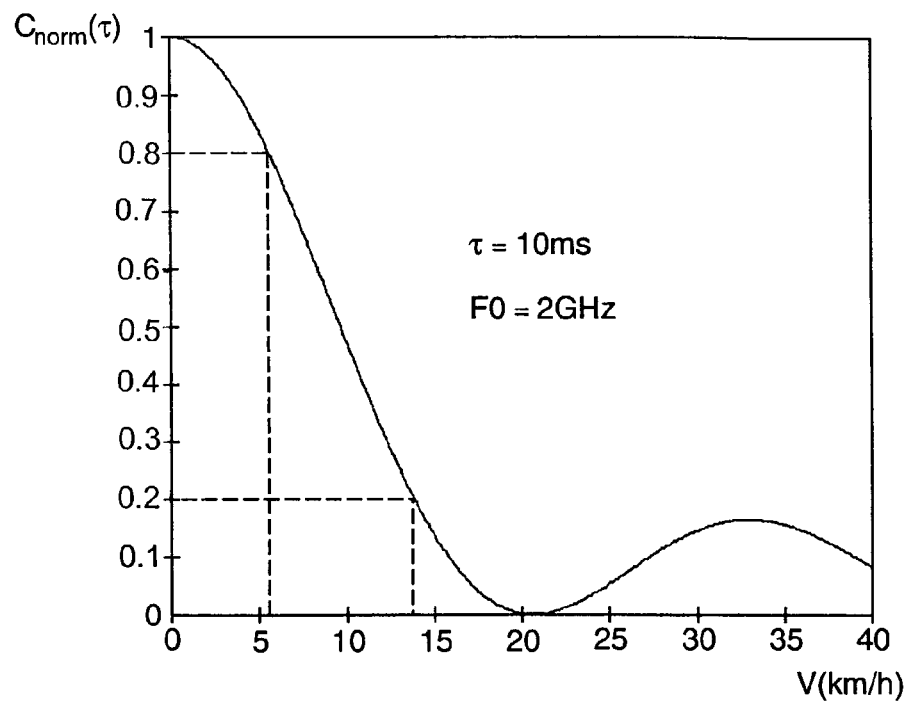
FIGS. 4 and 5 illustrate two curves of normalized auto-covariance for two different values of the parameter τ according to the present invention.
Figure 5:
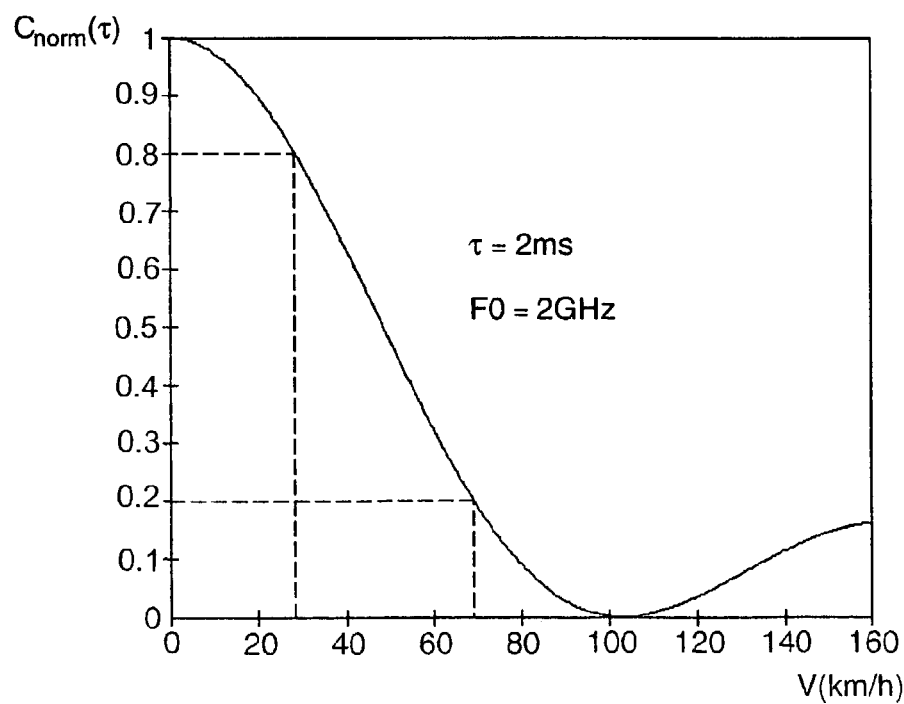

In this formula (V), c designates the speed of light and F0 the carrier frequency, such as 2 GHz, for example. Irrespective of the value of τ, the curves of normalized auto-covariance all exhibit the same profile, as illustrated in FIGS. 4 and 5 for values of τ respectively equal to 10 ms and 2 ms. The only difference resides in the positioning of the auto-covariance curve with respect to the speed scale.

Thus, it is seen that for a value of τ=10 ms, the 0 value of the normalized auto-covariance is situated in the vicinity of 20 km/h, while it is situated in the vicinity of 100 km/h for τ=2 ms. It is also noted that irrespective of the value of τ, the curves exhibit a substantially linear and monotonic profile between a result with normalized auto-covariance equal to 0.2 and a result with normalized auto-covariance equal to 0.8. Above 0.8, the curve starts to flatten out. Below 0.2, an ambiguity exists since several possible values of speed correspond to the same value of normalized auto-covariance.

Figure 6:
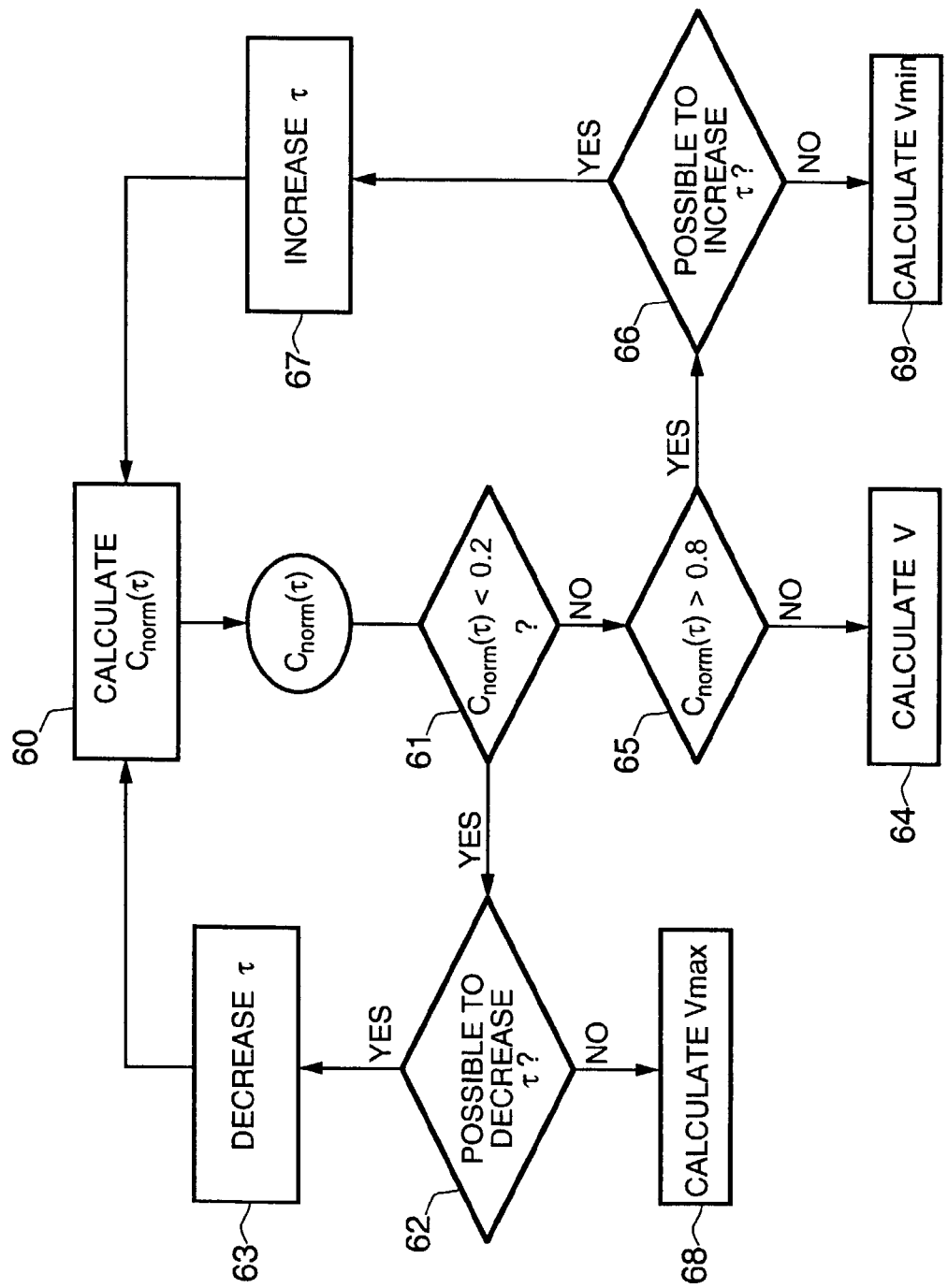
FIG. 6 illustrates a mode of implementation of the process according to the present invention, allowing adaptation of the parameter τ.

Hence, it is especially advantageous to adapt the value of τ, and also the value of M, as a function of the result obtained for the normalized auto-covariance $C_{norm}(\tau)$. This adaptation, performed by the means of adaptation, is illustrated in FIG. 6.

After having calculated the normalized auto-covariance in step 60, the result is compared with the lower threshold value taken here equal to 0.2 (step 61). If this result is greater than 0.2, it is compared in step 65 with the upper threshold value taken here equal to 0.8. If this result is less than 0.8, the speed V of movement of the mobile is then determined in accordance with formula (V) in step 64.

If, conversely, in step 61 the result of the normalized auto-covariance is less than 0.2, the means of adaptation will examine whether it is possible to decrease the value of τ. If this is the case, τ is decreased (step 63) and, at the same time, the number M of power samples is increased. A new calculation of normalized auto-covariance is then performed in step 60.

It is not always possible or desirable to decrease the parameter τ. Indeed, if a calculation of normalized auto-covariance has already been performed with a value of τ=0.66 ms, for example, and 400 power samples (M=400), (corresponding to speed ranges between 80 and 200 km/h for a carrier frequency equal to 2 GHz) and a normalized auto-covariance result is obtained which is still less than 0.2, this signifies that one is situated in an extremely high speed range for the mobile terminal. If may then not be of interest, or even useful, to further decrease the value of τ to refine the speed accuracy. In this case, one will prefer to calculate a speed $V_{max}$ by using this value of τ and an auto-covariance result equal to 0.2. The actual speed of movement of the mobile terminal will then be greater than or equal to this speed $V_{max}$.

Likewise, if in step 65 a normalized auto-covariance result of greater than 0.8 is obtained, the means of adaptation will examine in step 66 whether it is possible to increase the value of τ. If this is the case, this value of τ will be increased in step 67 while decreasing the number M of samples in parallel. Next, a new auto-covariance calculation is performed.

If, on the other hand, an auto-covariance calculation has already been performed with a value of τ=10 ms for example, and M=100, and a normalized auto-covariance result of greater than 0.8 is obtained, this signifies that the speed of movement of the mobile is very small. It may not then be necessary to increase the value of τ to refine the accuracy in the speed of movement of the mobile.

A speed value $V_{min}$ will then be calculated in step 69 with this value of τ and an auto-covariance result equal to 0.8. The actual speed of the mobile terminal will then be less than or equal to this value $V_{min}$.

The invention is not limited to the embodiments and modes of implementation which have just been described, but embraces all variations thereof. Thus, the invention can be implemented in a base station, on the basis of the signal received by the base station and originating from the mobile telephone. Moreover, the invention applies equally to wireless communication systems which use frequency division and/or time division, such as the telephone systems of the GSM type, for example.

That which is claimed is:

1. A process for estimating a speed of movement of a mobile terminal operating in a wireless communication system and communicating with a base station, the process comprising:

calculating a normalized auto-covariance of an instantaneous power of a signal received by the mobile terminal or by the base station, the calculating being performed with a time shift parameter providing a normalized auto-covariance curve having a substantially linear and monotonic profile between lower and upper thresholds.

2. A process according to claim 1, wherein the lower threshold is equal to about 0.2, and the upper threshold is equal to about 0.8.

3. A process according to claim 1, further comprising adapting a value of the time shift parameter for providing the normalized auto-covariance result between the lower and upper thresholds.

4. A process according to claim 1, wherein the calculating comprises:
   calculating an instantaneous power of the received signal;
   filtering the received signal;
   calculating an average power of the received signal; and
   subtracting the average power from an autocorrelation of the calculated instantaneous power.

5. A process according to claim 4, wherein the received signal includes information formed of fragments incorporated within successive intervals each containing a predetermined number of fragments; wherein calculating the normalized auto-covariance is performed on M intervals mutually time-shifted by a time shift parameter associated therewith; wherein calculating the instantaneous power and filtering the received signal comprises for each of the M intervals calculating power over a predetermined number P of fragments of the relevant interval for obtaining P power samples, and averaging the P samples for obtaining a single final power sample for the relevant interval; and wherein calculating the average power is performed by averaging the M final power samples.

6. A process according to claim 5, further comprising adapting a value of the time shift parameter and adapting a value of M, with M increasing as the time shift parameter decreases and with M decreasing as the time shift parameter increases.

7. A cellular telephone comprising:
   an antenna;
   an analog stage connected to said antenna; and
   speed estimation means connected to said antenna for estimating a speed of movement of the cellular telephone by calculating a normalized auto-covariance of an instantaneous power of a signal transmitted by a base station, the calculating being performed with a time shift parameter providing a normalized auto-covariance curve having a substantially linear and monotonic profile between lower and upper thresholds.

8. A cellular telephone according to claim 7, wherein the lower threshold is equal to about 0.2, and the upper threshold is equal to about 0.8.

9. A cellular telephone according to claim 7, wherein said speed estimation means comprises adaption means for adapting a value of the time shift parameter for providing the result of the normalized auto-covariance between the lower and upper thresholds.

10. A cellular telephone according to claim 9, wherein said speed estimation means further comprises:
   first power calculation means for calculating an instantaneous power of the received signal;
   filter means for filtering the received signal;
   second power calculation means for calculating an average power of the received signal; and subtraction means for subtracting the average power from an autocorrelation of the instantaneous power.

11. A cellular telephone according to claim 10, wherein the signal conveys information formed of fragments incorporated within successive intervals each containing a predetermined number of fragments; wherein said speed estimation means calculates the normalized auto-covariance on M intervals mutually time-shifted by the time shift parameter of the normalized autocovariance; wherein said first power calculation means and said filter means performs for each of the M intervals a calculation of power over a predetermined number P of fragments of the relevant interval for obtaining P power samples, and averages the P power samples for obtaining a single final power sample for the relevant interval; and wherein said second power calculation means computes an average of the M final power samples.

12. A cellular telephone according to claim 11, wherein said adaption means adapts a value of M, with M increasing as the time shift parameter decreases and with decreasing as the time shift parameter increases.

13. A cellular telephone comprising:
an antenna;
an analog stage connected to said antenna; and
a digital stage connected to said analog stage for estimating a speed of movement of the, cellular telephone by calculating a normalized auto-covariance of an instantaneous power of a signal transmitted by a base station, the calculating being performed with a time shift parameter providing a normalized auto-covariance curve having a substantially linear and monotonic profile between lower and upper thresholds.

14. A cellular telephone according to claim 13, wherein the lower threshold is equal to about 0.2, and the upper threshold is equal to about 0.8.

15. A cellular telephone according to claim 13, wherein said digital stage adapts a value of the time shift parameter for providing the result of the normalized auto-covariance between the lower and upper thresholds.

16. A cellular telephone according to claim 15, wherein calculating the normalized auto-covariance comprises:
calculating an instantaneous power of the received signal;
filtering the received signal;
calculating an average power of the received signal; and
subtracting the average power from an autocorrelation of the instantaneous power.

17. A cellular telephone according to claim 16, wherein the signal conveys information formed of fragments incorporated within successive intervals each containing a predetermined number of fragments; wherein the normalized auto-covariance is calculated on M intervals mutually time-shifted by the time shift parameter of the normalized auto-covariance; wherein calculating the instantaneous power and filtering the received signal is performed for each of the M intervals by calculating power over a predetermined number P of fragments of the relevant interval for obtaining P power samples, and averaging the P power samples for obtaining a single final power sample for the relevant interval; and wherein calculating the average power comprises calculating an average of the M final power samples.

18. A cellular telephone according to claim 17, wherein the adapting comprises adapting a value of N, with M increasing as the time shift parameter decreases and with decreasing as the time shift parameter increases.

19. A base station comprising:
an antenna;
an analog stage connected to said antenna; and
a digital stage connected to said analog stage for estimating a speed of movement of a cellular telephone communicating with the base station by calculating a normalized auto-covariance of an instantaneous power of a signal transmitted by the cellular telephone, the calculating being performed with a time shift parameter providing a normalized auto-covariance curve having a substantially linear and monotonic profile between lower and upper thresholds.

20. A base station according to claim 19, wherein the lower threshold is equal to about 0.2, and the upper threshold is equal to about 0.8.

21. A base station according to claim 19, wherein said digital stage adapts a value of the time shift parameter for providing the result of the normalized auto-covariance between the lower and upper thresholds.

22. A base station according to claim 21, wherein calculating the normalized auto-covariance comprises:
calculating an instantaneous power of the received signal;
filtering the received signal;
calculating an average power of the received signal; and
subtracting the average power from an autocorrelation of the instantaneous power.

23. A base station according to claim 22, wherein the signal conveys information formed of fragments incorporated within successive intervals each containing a predetermined number of fragments; wherein the normalized auto-covariance is calculated on M intervals mutually time-shifted by the time shift parameter of the normalized auto-covariance; wherein calculating the instantaneous power and filtering the received signal is performed for each of the M intervals by calculating power over a predetermined number P of fragments of the relevant interval for obtaining P power samples, and averaging the P power samples for obtaining a single final power sample for the relevant interval; and wherein calculating the average power comprises calculating an average of the M final power samples.

24. A base station according to claim 23, wherein the adapting comprises adapting a value of M, with M increasing as the time shift parameter decreases and with decreasing as the time shift parameter increases.

25. A communications system comprising:
a base station; and
at least one cellular telephone;
at least one of said base station and said at least one cellular telephone comprising a signal processor for estimating a speed of movement of said at least one cellular telephone by calculating a normalized auto-covariance of an instantaneous power of a signal transmitted by said at least one cellular telephone or said base station, the calculating being performed with a time shift parameter providing a normalized autocovariance curve having a substantially linear and monotonic profile between lower and upper thresholds.

26. A communications system according to claim 25, wherein the lower threshold is equal to about 0.2, and the upper threshold is equal to about 0.8.

27. A communications system according to claim 25, wherein said signal processor adapts a value of the time shift parameter for providing the result of the normalized auto-covariance between the lower and upper thresholds.

28. A communications system according to claim 27, wherein calculating the normalized auto-covariance comprises:

calculating an instantaneous power of the received signal;
filtering the received signal;
calculating an average power of the received signal; and
subtracting the average power from an autocorrelation of the instantaneous power.

29. A communications system according to claim 28, wherein the signal conveys information formed of fragments incorporated within successive intervals each containing a predetermined number of fragments; wherein the normalized auto-covariance is calculated on M intervals mutually time-shifted by the time shift parameter of the normalized auto-covariance; wherein calculating the instantaneous power and filtering the received signal is performed for each of the M intervals by calculating power over a predetermined number P of fragments of the relevant interval for obtaining P power samples, and averaging the P power samples for obtaining a single final power sample for the relevant interval; and wherein calculating the average power comprises calculating an average of the M final power samples.

30. A communications system according to claim 29, wherein the adapting comprises adapting a value of M, with M increasing as the time shift parameter decreases and with decreasing as the time shift parameter increases.

* * * * *